United States Patent [19]
Aronoff et al.

[11] Patent Number: 5,020,213
[45] Date of Patent: Jun. 4, 1991

[54] METHOD OF PRODUCING A HEAD CORE SLIDER

[75] Inventors: Michael I. Aronoff, Goleta, Calif.; Soichiro Matsuzawa, Kuwana; Nobuhiro Terada, Kasugai, both of Japan

[73] Assignees: Applied Magnetics Corporation, Goleta, Calif.; NGK Insulators, Ltd., Aichi, Japan

[21] Appl. No.: 450,566

[22] Filed: Dec. 14, 1989

[51] Int. Cl.⁵ .................................................. G11B 5/42
[52] U.S. Cl. ........................................ 29/603; 360/103; 360/122
[58] Field of Search ................... 29/603; 360/102, 103, 360/104, 105, 122, 125, 127

[56] References Cited
U.S. PATENT DOCUMENTS 4,381,966 5/1983 Rasekhi et al. ................. 360/122 X
4,843,486 6/1989 Yoshimatsu et al. ............. 29/603 X Primary Examiner—Carl E. Hall
Attorney, Agent, or Firm—Parkhurst, Wendel & Rossi

[57] ABSTRACT

Method for producing a head core slider for a rigid magnetic disk drive, including a ferrite slider body having a pair of air bearing portions which have a predetermined height and are spaced apart from each other in a transverse direction perpendicular to a direction of extension thereof, and further including a pair of ferrite yoke portions formed integrally with the slider body. The yoke portions cooperate with the slider body to form a first and a second closed magnetic path and define therebetween a first and a second magnetic gap. The slider body and the yoke portions cooperate to provide a first and a second track portion in which the first and second magnetic gaps are open, respectively. The first and second track portions have sliding surfaces which have the same height as the air bearing portions. The first track portion is used exclusively for an information writing operation, while the second track portion is used exclusively for an information reading operation. Where the first and second track portions have a same width, the first and second magnetic gaps have different sizes. Where the two magnetic gaps have a same size, the two track portions have different widths. Alternatively, the two track portions have different widths while the two magnetic gaps have different sizes.

3 Claims, 12 Drawing Sheets

METHOD OF PRODUCING A HEAD CORE SLIDER

BACKGROUND OF THE INVENTION

1. Field of the Invention

The present invention relates generally to a core slider of a magnetic head for a rigid magnetic disk drive, and a method for producing such a core slider, and more particularly to improvements of the core slider in its information reading and writing characteristics.

2. Discussion of the Prior Art

In the art of a rigid magnetic disk drive (RDD), there is known a floating-type magnetic head core slider which generally includes a slider body, and at least one yoke portion which cooperates with the slider body to form a closed magnetic path and define a magnetic gap open in a sliding surface. More specifically, the slider body has a pair of air bearing portions whose air bearing surfaces have a suitable height, and the sliding surface is provided on a track portion which is formed so as to extend across the magnetic gap, between the slider body and the yoke portion. The sliding surface of the track portion has a suitable width and the same height as the air bearing surfaces of the air bearing portions.

The core slider is roughly classified into three types, depending upon the position and number of the yoke portion or portions bonded to the slider body. The first type has one yoke portion (track portion) which is positioned in the middle of a distance between two air bearing portions. The second type has one yoke portion (track portion) which is formed so as to extend from one end of one of two air bearing portions. The third type has two yoke portions (track portions) each formed so as to extend from one end of the corresponding one of the two air bearing portions. In these three types of core slider, only one yoke portion (track portion) is used for writing (storing) and reading (reproducing) information on and from a magnetic disk, even where two yoke portions are provided.

The third type of core slider having two yoke portions, as well as the first and second types having only one yoke portion, is adapted such that one of the yoke portions is used to effect information writing and reading operations, and the other yoke portion is not associated with the information writing and reading operations. Namely, one of the two yoke portions cooperates with the slider body to form a track portion in which is open an information writing and reading magnetic gap.

In the known core slider, therefore, the writing and reading track portion formed between the yoke portion and the slider body should be constructed so as to provide acceptable characteristics in both reading and writing operations, even where the two yoke portions are provided. In other words, the core slider does not exhibit excellent "off-track" characteristics not only in the information reading from a magnetic disk, but also in the information writing on the magnetic disk.

In the RDD or rigid magnetic disk drive, an exclusive magnetic head is not provided, and new information is written over the previously stored or written information. Therefore, when new information is written over the previous information while the magnetic disk is in a floating or "off-track" condition with respect to the core slider, the previous information may be partially left unerased as undesirable remnant signals, which create noises upon reproduction of the newly stored information. This may lead to a lowered S/N ratio of the magnetic head, and an information reading error. To avoid the remnant signals, it is desirable that the writing width of the core slider be sufficiently larger than the reading width, so that the previous information may not be read, even if remnant signals may be left.

In the known core slider wherein a common track (track portion) is used for both writing and reading purposes, however, the writing width cannot be made sufficiently larger that the reading width, and the remnants cannot be effectively avoided. Thus, the S/N ratio, or the so-called "off-track" operating characteristics of the core slider cannot be sufficiently improved.

Where information writing and reading operations are effected by respective magnetic gaps, an optimum ratio of the size or length of the information writing magnetic gap in the longitudinal direction of the track to that of the information reading magnetic gap varies depending upon the coercivity of a recording medium, the thickness of the magnetic layer and the recording wavelength. Generally, the size of the writing magnetic gap should preferably be larger than that of the reading magnetic gap. However, where the same maganetic gap is used for both reading and writing operations, the size of the gap is determined so as to provide a compromise or balance between the reading and writing characteristics. In this case, it is difficult to make the best use of the properties or characteristics of the recording medium, and therefore difficult to obtain a sufficiently high density of information storage per unit area of the recording medium. This means a relatively low storage capacity of the medium.

SUMMARY OF THE INVENTION

It is therefore a first object of the present invention to provide a head core slider with two different track portions for a rigid magnetic disk drive. For example, the head core slider has an information writing track and an information reading track, wherein the width of the information writing track is larger than that of the information reading track, thereby exhibiting improved "off-track" operating characteristics. Alternatively, the information writing track has an information writing magnetic gap whose size is larger than that of an information reading magnetic gap, thereby permitting improved information writing and reading operations suitable to a recording medium. The present two-track core slider has various other utilities.

A second object of the invention is to provide a method suitable for producing the head core slider indicated above.

The first object may be achieved according to one aspect of the present invention, which provides a head core slider for a rigid magnetic disk drive, comprising: a ferrite slider body having a pair of air bearing portions which have a predetermined height and are spaced apart from each other in a transverse direction perpendicular to a direction of extension thereof; and a pair of ferrite yoke portions formed integrally with the slider body. The yoke portions cooperate with the slider body to form a first and a second closed magnetic path and define therebetween a first and a second magnetic gap. The slider body and the pair of yoke portions cooperate to provide a first and a second track portion in which the first and second magnetic gaps are open, respectively. The first and second track portions have sliding surfaces which have the same height as the air bearing portions. The first track portion is different from the second track portion. Namely, the first track portion may be used for an information writing operation, while the second track portion may be used exclusively for an information reading operation.

The core slider of the present invention constructed as described above may be efficiently produced, because the air bearing portions and the track portions may be concurrently formed by etching, as described below. Further, the slider body and the pair of yoke portions cooperate to provide the first and second track portions in which the respective magnetic gaps are open, whereby one of the first and second track portions can be used exclusively for effecting an information writing or storing operation, while the other track protion can be used exclusively for effecting an information reading or reproducing operation. Accordingly, the first and second track portions may be adapted, independently of each other, to provide optimum information writing characteristics and optimum information reading characteristics.

In one form of the core slider of the invention, the first and second track portions have a same width in the transverse direction, and the first magnetic gap has a larger size in the direction of extension, than the second magnetic gap. Namely, the first magnetic gap is used as an information writing gap, while the second magnetic gap is used as an information reading gap. In this case, the core slider permits excellent information writing and reading operations, while making a good use of the properties of a recording medium.

The second object may be attained according to another aspect of the invention, which provides a method of producing the above form of the core slider. The method comprises the steps of: forming a primary groove in at least one of abutting surfaces of a first and a second ferrite block, by etching the at least one abutting surface through a first etching mask applied thereto; forming a plurality of secondary recesses in at least one of the abutting surfaces of the first and second ferrite blocks, by etching the at least one abutting surface through a second etching mask applied thereto; butting and bonding together the first and second ferrite blocks at the abutting surfaces, to form an integral ferrite bar which has a closed magnetic path defined between the first and second blocks, the ferrite bar having a first magnetic gap corresponding to a total depth of the primary groove, and a second magnetic gap corresponding to a total depth of the primary groove and the secondary recesses; applying a third etching mask to a surface of the ferrite bar in which the first and second magnetic gaps are open, and etching the surface of the ferrite bar to form a plurality of spaced-apart air bearing portions on the first ferrite block, and a plurality of track portions which extend from the air bearing portions, respectively, and between the first and second ferrite blocks, the air bearing portions and the track portions having a predetermined height, and the track portions having a same width in a transverse direction perpendicular to a direction of extension of the air bearing portions, the first magnetic gap being open in one of each pair of two adjacent track portions of the plurality of track portions, while the second magnetic gap being open in the other of the each pair of two adjacent track portions; and cutting the ferrite bar to prepare at least one core slider, each of which includes a slider body having the two adjacent air bearing portions corresponding to the above-indicated adjacent two track portions, and a pair of yoke portions which are formed on the second ferrite block and which cooperate with the slider body to form the adjacent two track portions.

In another form of the core slider of the invention, the first and second magnetic gaps have a same size in the direction of extension, and the first or information writing track portion has a larger width in the transverse direction, than the second or information reading track portion. In this case, the core slider exhibits improved "off-track" operating characteristics, that is, does not suffer from undesirable reduction in the S/N ratio due to remnant signals upon reproduction of information written over the previously stored information.

The second object may also be attained according to a further aspect of the invention, which provides a method of producing the above form of the core slider, which comprises the steps of: forming a groove in at least one of abutting surfaces of a first and a second ferrite block; butting and bonding together the first and second ferrite blocks at the abutting surfaces, to form an integral ferrite bar which has a closed magnetic path defined between the first and second blocks, the ferrite bar having a magnetic gap corresponding to a depth of the groove; applying an etching mask to a surface of the ferrite bar in which the magnetic gap is open, and etching the surface of the ferrite bar to form a plurality of spaced-apart air bearing portions on the first ferrite block, and a plurality of track portions which extend from the air bearing portions, respectively, and between the first and second ferrite blocks, the air bearing portions and the track portions having a predetermined height, one of each pair of two adjacent track portions of the plurality of track portions having a larger width in a transverse direction perpendicular to a direction of extension of the air bearing portions, than the other of the each pair of two adjacent track portions; and cutting the ferrite bar to prepare at least one core slider, each of which includes a slider body having the two adjacent air bearing portions corresponding to the above-indicated two adjacent track portions, and a pair of yoke portions which are formed on the second ferrite block and which cooperate with the slider body to form the two adjacent track portions.

In a further form of the core slider of the invention, the first track portion has a larger width in the transverse direction than the second track portion, and the first or information writing magnetic gap has a larger size in the direction of extension than the second or information reading magnetic gap. In this case, the core slider not only exhibits excellent "off-track" operating characteristics, but also permits improved information writing and reading operations.

The second object may also be attained according to a still further aspect of the invention, which comprises the steps of: forming a primary groove in at least one of abutting surfaces of a first and a second ferrite block, by etching the at least one abutting surface through a first etching mask applied thereto; forming a plurality of secondary recesses in at least one of the abutting surfaces of the first and second ferrite blocks, by etching the at least one abutting surface through a second etching mask applied thereto; butting and bonding together the first and second ferrite blocks at the abutting surfaces, to form an integral ferrite bar which has a closed magnetic path defined between the first and second blocks, the ferrite bar having a first magnetic gap corresponding to a total depth of the primary groove, and a second magnetic gap corresponding to a total depth of the primary groove and the secondary recesses; applying a third etching mask to a surface of the ferrite bar in which the first and second magnetic gaps are open, and etching the surface of the ferrite bar to form a plurality of parallel spaced-apart air bearing portions on said first ferrite block, and a plurality of track portions which extend from said air bearing portions, respectively, and between the first and second ferrite blocks, the air bearing portions and the track portions having a predetermined height, the first magnetic gap being open in one of each pair of two adjacent track portions of the plurality of track portions, while the second magnetic gap being open in the other of the each pair of two adjacent track portions, the other of the each pair of two adjacent track portions having a larger width in a transverse direction perpendicular to a direction of extension of the air bearing portions, than the one of the each pair of two adjacent track portions; and cutting the ferrite bar to prepare at least one core slider, each of which includes a slider body having the two adjacent air bearing portions corresponding to the above-indicated two adjacent track portions, and a pair of yoke portions which are formed on the second ferrite block and which cooperate with the slider body to form the two adjacent track portions.

BRIEF DESCRIPTION OF THE DRAWINGS

The foregoing and optional objects, features and advantages of the present invention will become more apparent by reading the following detailed description of presently preferred embodiments of the invention, when considered in conjunction with the accompanying drawings, in which:

FIGS. 16 through 21(a) and 21(b) are views showing another embodiment of the invention, FIG. 16 corresponding to that of FIG. 8, FIG. 17 corresponding to that of FIG. 9, FIG. 18 corresponding to that of FIG. 10, FIG. 19 corresponding to that of FIG. 11(a), FIG. 20 corresponding to that of FIG. 14, FIG. 21(a) corresponding to that of FIG. 15(a), and FIG. 21(b) corresponding to that of FIG. 15(b); and FIGS. 22 through 25(a) and 25(b) are views showing a further embodiment of the invention, FIG. 22 being an enlarged fragmentary view of an integral ferrite bar to which a third etching mask is applied; FIG. 23 being an enlarged fragmentary plan view of the ferrite bar which has been etched through the third mask, FIGS. 24, 25(a) and 25(b) corresponding to those of FIGS. 14, 15(a) and 15(b), respectively.

DETAILED DESCRIPTION OF THE PREFERRED EMBODIMENTS

By reference to the accompanying drawings, three different embodiments of the core slider of this invention will be illustrated, to further clarify the principle of the invention.

In the core slider according to the first embodiment, a pair of track portions have the same width, while magnetic gaps corresponding to the two track portions have different sizes. In the second embodiment, the core slider have a pair of magnetic gaps having the same size while the corresponding track portions have different widths. In the core slider according to the third embodiment, the pair of track portions have different widths, while one of the magnetic gaps which corresponds to the relatively wide track portion has a larger size than the other relatively narrow magnetic gap.

Figure 1A:
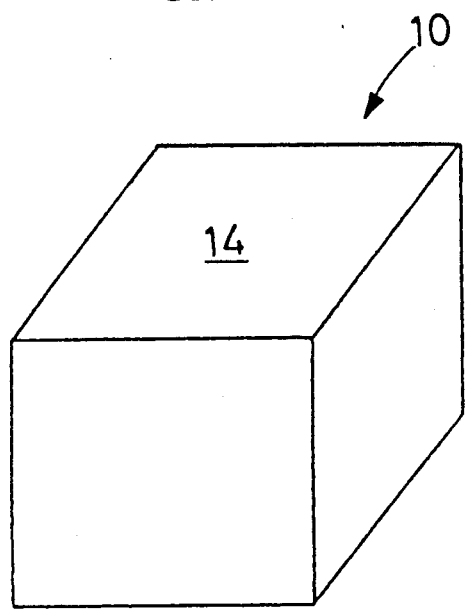
FIGS. 1(a) and 1(b) are perspective views of two ferrite blocks which are processed and bonded together according to one embodiment of the present invention.
Figure 1B:
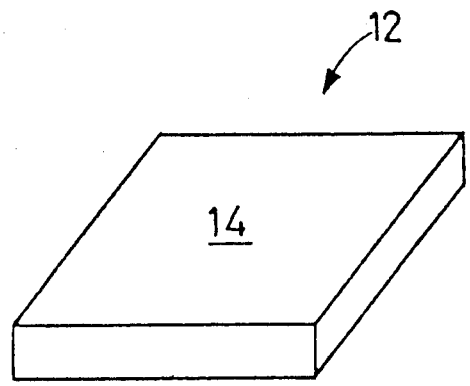

Referring first to FIGS. 1(a) and 1(b) showing the first embodiment wherein the pair of track portions have the same width while the corresponding magnetic gaps have the different sizes, there are respectively shown a first ferrite block 10 and a second ferrite block 12 which have elongate rectangular configurations. As described below by reference to FIG. 14, these first and second ferrite blocks 10, 12 give a core slider which has a slider body 64 and a pair of yoke portions 58, 60.

The ferrite blocks 10, 12 are formed of a conventionally used ferrite material having a high degree of magnetic permeability. For example, the ferrite blocks 10, 12 may consist of single crystals or polycrystal structures of Mn-Zn ferrite or Ni-Zn ferrite, or may be a composite structure consisting of a single crystal ferrite portion and a polycrystal ferrite portion. Where a ferrite single crystal is used for the ferrite block, one of the following combinations of crystal planes and directions is preferably used as a plane of the surface of each air bearing portion 44 (FIG. 11) on which a magnetic disk slides, and a direction in which the air bearing portion 44 extends: (100) and <100>; (100) and <110>; (110) and <100>; (110) and <110>; (311) and <332>; (332) and <311>; (611) and <331>; (331) and <611>; and (211) and <111>.

The first and second ferrite blocks 10, 12 are dimensioned so as to provide two integral ferrite bars 38 (FIG. 8) each of which gives two core sliders.

Figure 2:
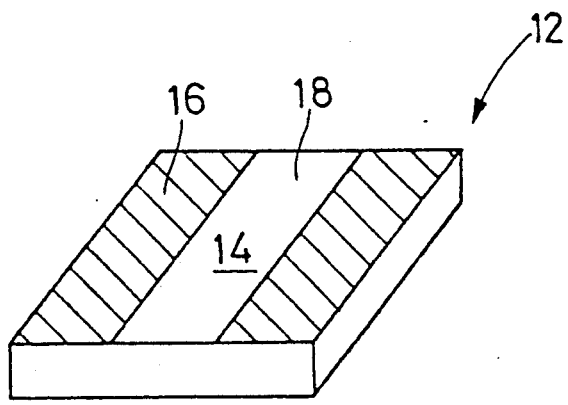
FIG. 2 is a perspective view of the second ferrite block to which a first etching mask is applied.
Figure 3:
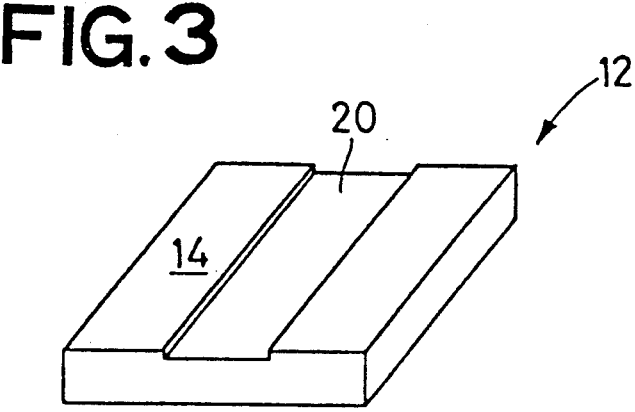
FIG. 3 is a perspective view of the second ferrite block in which a primary groove is formed.

The prepared two ferrite blocks 10, 12 have abutting surfaces 14, 14 which are held in abutting contact with each other when the ferrite blocks 10, 12 are bonded together in the manner described below. Initially, a first etching mask 16 is applied to the abutting surface 14 of the second ferrite block 12, as shown in FIG. 2, such that a portion of the abutting surface 14 is uncovered by the first etching mask 16, as an exposed area 18 corresponding to reading magnetic gaps (indicated at 32 in FIGS. 8 and 9) which will be formed adjacent to disk sliding surfaces of the respective core sliders. With the abutting surface 14 of the second ferrite block 12 chemically etched through the first etching mask 16, there is formed a primary groove 20 which corresponds to the exposed area 18, as shown in FIG. 3. The formed primary groove 20 has a depth which corresponds to the size of the reading magnetic gap 32 of the core slider, which is determined so as to provide optimum information reading characteristics.

The first etching mask 16 is formed on the abutting surface 14, by a suitable known technique such as screen printing, which is selected to meet the required accuracy and economy or efficiency of production. In particular, a photoetching method using a photoresist is preferably practiced for relatively easy formation of the masking pattern. The etching mask 16 may be formed of a positive or a negative type photoresist, or formed of a suitable metallic material such as Cr, or SiO or $SiO_2$, by vacuum vapor deposition, sputtering, chemical vapor deposition (CVD) or other technique. The method of forming the mask 16 and the material of the mask are suitably selected from various standpoints, such as the adhesiveness of the mask to the abutting surface 14.

The ferrite block 12 with the first etching mask 16 applied thereto is etched by an ordinary electrolytic etching or chemical etching method, preferably by using an aqueous solution consisting of water and the balance principally consisting of phosphoric acid, as disclosed in laid-open publication No. 62-83483 (published in 1987) of unexamined Japanese Patent Application.

Figure 14:
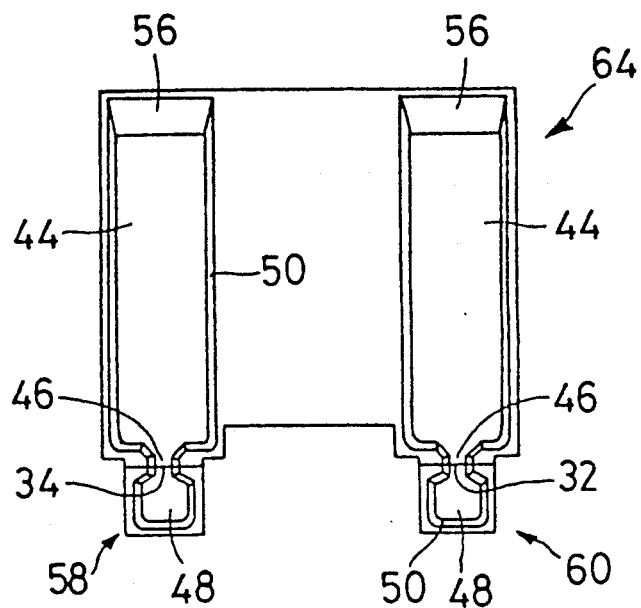
FIG. 14 is a plan view of a core slider obtained by cutting the ferrite bar of FIG. 13.

In the instant embodiment, the primary groove 20 is formed only in the second ferrite block 12. However, the groove 20 may be formed in the first ferrite block 10, or similar grooves may be formed in both of the first and second ferrite blocks 10, 12. Where the grooves are formed in the two ferrite blocks 10, 12, the blocks should be etched so that the total depth of the two grooves provides the predetermined size of the reading magnetic gap 32 of the core sliders suitable for providing the optimum information reading characteristics. While the primary groove 20 illustrated in FIG. 3 is formed as a continuous groove extending in the longitudinal direction of the second ferrite block 12, the groove or grooves formed in the block or blocks 10, 12 need not be formed continuously, but may be replaced by separate recesses formed in respective portions of the block or blocks in which the reading magnetic gaps 32 are formed between the slider body 64 and the yoke portions 58, 60 (FIG. 14).

Figure 4:
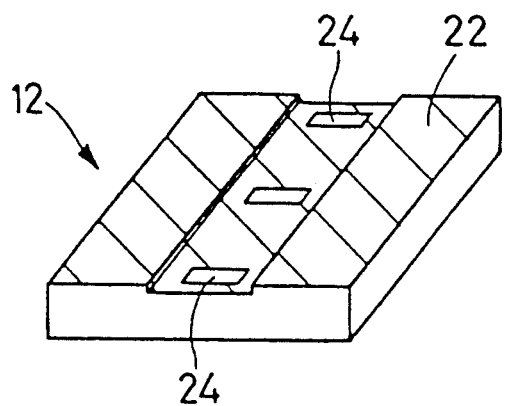
FIG. 4 is a perspective view of the second ferrite block to which a second etching mask is applied.
Figure 5:
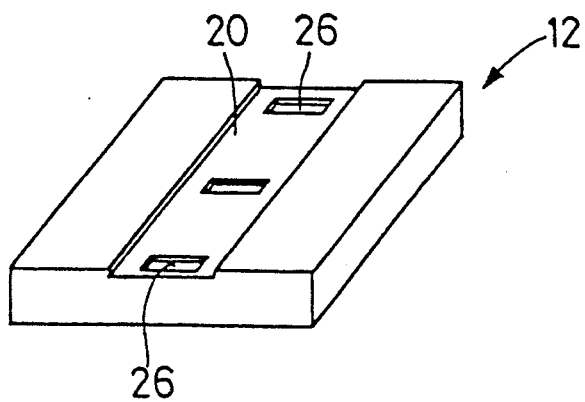
FIG. 5 is a perspective view of the second ferrite block in which secondary grooves are formed.

After the primary groove 20 is formed in the abutting surface 14 of the second ferrite block 12 by the etching through the first etching mask 16, a second etching mask 22 is applied to the abutting surface 14 and the bottom surface of the primary groove 20, such that portions of the bottom surface of the groove 20 corresponding to recording magnetic gaps 34 of the core sliders (FIGS. 8 and 9) are left uncovered as exposed areas 24, as shown in FIG. 4. The second ferrite block 12 is then etched through the second etching mask 22, in the same manner as described above with respect to the first etching mask 16. As a result, separate secondary recesses 26 corresponding to the exposed areas 24 are formed such that the grooves 26 are spaced apart from each other in the longitudinal direction of the ferrite block 12, as shown in FIG. 5. The depth of the secondary recesses 26 is determined so that the total depth of the primary groove 20 and secondary recess 26 corresponds to the size of the recording magnetic gaps 34 which is determined so as to provide optimum information writing or recording characteristics.

In the present embodiment, the second ferrite block 12 is provided with the three longitudinally spaced-apart secondary recesses 26, as shown in FIG. 5, so that each of the two ferrite bars 38, 38 (FIG. 8) obtained from a ferrite body of the first and second ferrite blocks 10, 12 provides two core sliders having the same cofiguration.

Although the secondary recesses 26 are formed only in the second ferrite block 12 in the illustrated embodiment, the grooves 26 may be formed only in the first ferrite block 10, or similar grooves may be formed in both of the first and second ferrite blocks 10, 12. Where the secondary grooves are formed in both of the blocks 10, 12, the etching operations through the first and second etching masks 16, 22 should be effected so that the total depth of the groove 20 and recess 26 corresponds to the size of the recording magnetic gaps 34 that enables the core sliders to provide the optimum information writing or recording characteristics.

Figure 6:
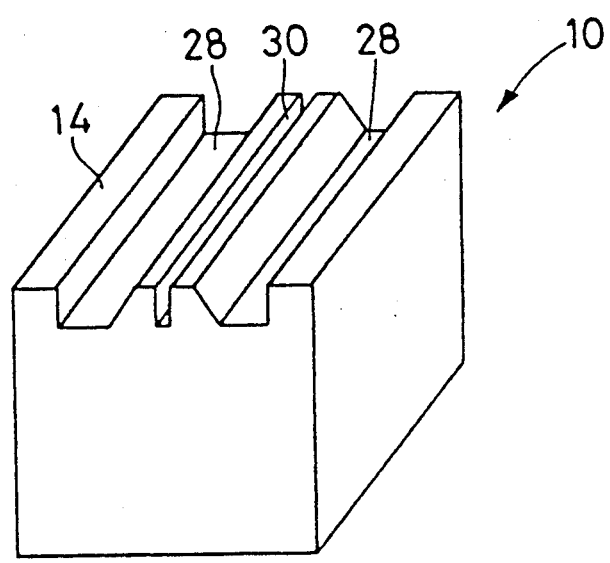
FIG. 6 is a perspective view of the first ferrite block in which coil-winding grooves and a center groove are formed.

While the second ferrite block 12 has the primary groove 20 and secondary recesses 26, the first ferrite block 10 is given a pair of coil-winding grooves 28 formed by machining in its abutting surface 14, as shown in FIG. 6, so that each groove 28 defines the inner end of the reading and recording magnetic gaps 32, 34 of each core slider which is remote from the disk sliding surface. The two coil-winding grooves 28 are provided corresponding to the two integral ferrite bars 38, 38 obtained from the ferrite body of FIG. 7. Between these two grooves 28, there is cut a center groove 30 which serves as an air escaping groove when a glass filler 36 is applied to the ferrite body of FIG. 7.

The coil-winding grooves 28 may be formed in the second ferrite block 12, rather than in the first ferrite block 10, or similar grooves may be formed in both of the blocks 10, 12. Where the coil-winding grooves 28, primary groove 20 and secondary recesses 26 are all formed in the same block 10 or 12, the order of formation of these grooves may be suitably determined.

Figure 7:
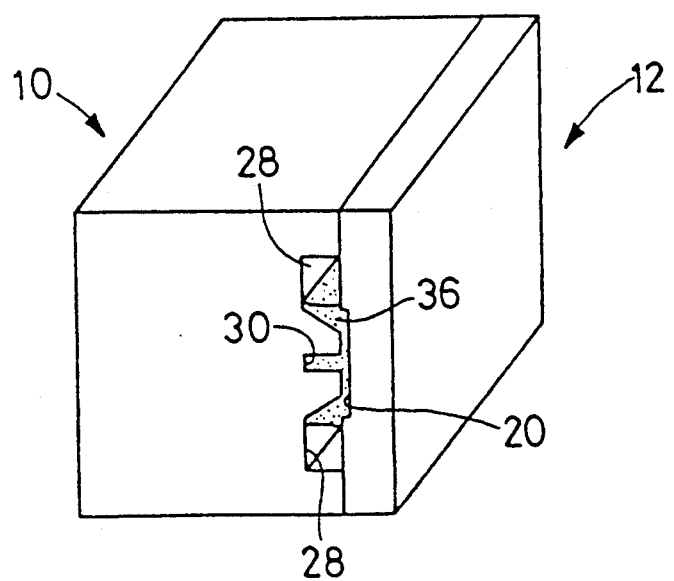
FIG. 7 is a perspective view of the ferrite blocks of FIGS. 5 and 6 which are bonded together into an integral ferrite body.

The first ferrite block 10 having the coil-winding grooves 28 and center groove 30, and the second ferrite block 12 having the primary groove 20 and secondary recesses 26 are butted together at the abutting surfaces 14, 14, such that the primary groove 20 is aligned with the center groove 30, as shown in FIG. 7. The two ferrite blocks 10, 12 are bonded together into the integral ferrite body at an elevated sintering temperature, for example, by known direct solid-solid reaction bonding at the non-processed (non-etched or machined) portions of the abutting surfaces 14 adjacent to the coil-winding grooves 28. In this ferrite body of FIG. 7, a substantially closed annular magnetic path is defined around each of the two coil-winding grooves 28.

The thus prepared integral ferrite body of FIG. 7 has a void consisting of the coil-winding grooves 28, center groove 30, primary groove 20 and secondary recesses 26. This void is filled with the above-indicated glass filler 36, with a suitable glass material heated into a molten state. This glass filler 36 protects the reading and recording magnetic gaps 32, 34, which will be described.

Figure 8:
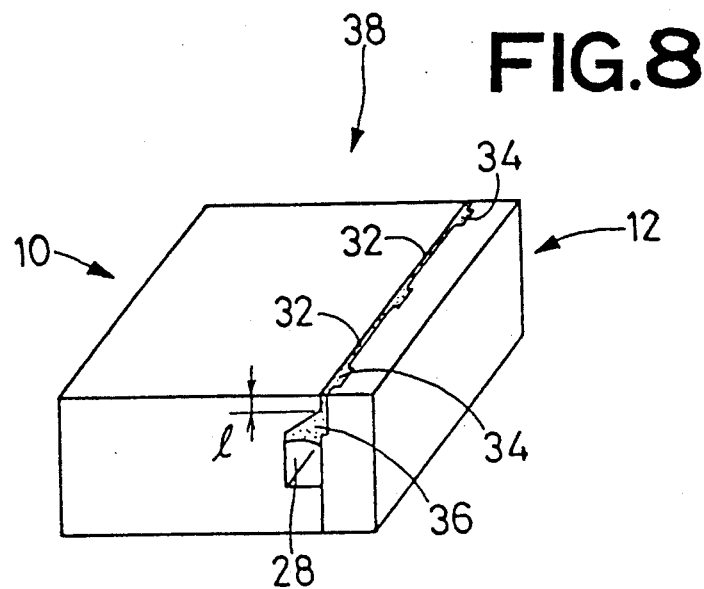
FIG. 8 is a perspective view of an integral ferrite bar obtained from the ferrite body of FIG. 7.
Figure 9:
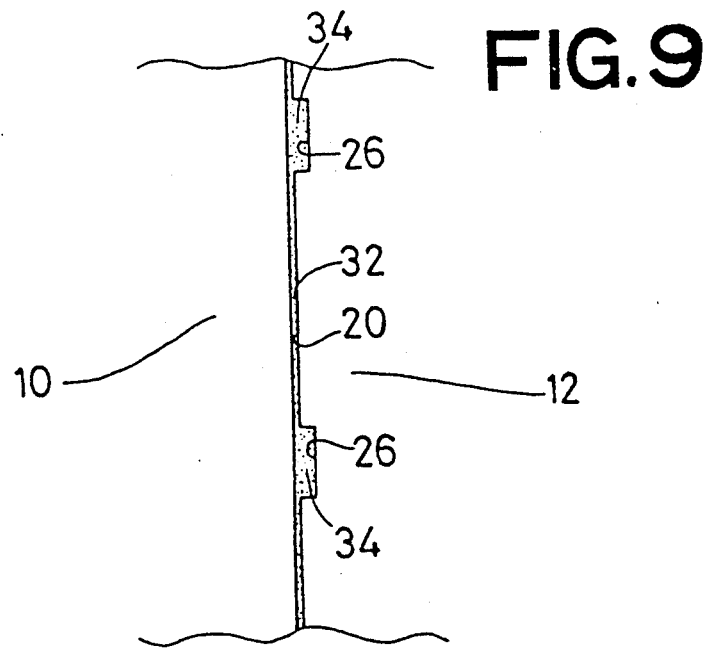
FIG. 9 is an enlarged fragmentary view showing magnetic gap portions of the ferrite bar of FIG. 8.

The ferrite body is then cut along the center groove 30, into two halves, i.e., into the two integral ferrite bars 38, 38 already indicated above. As shown in FIGS. 8 and 9, each of the ferrite bars 38 has the reading magnetic gaps 32 which have a relatively small size suitable for information reading, and the recording magnetic gaps 34 which have a relatively large size suitable for information recording. These reading and recording magnetic gaps 32, 34 are arranged alternately in the longitudinal direction of the ferrite bar 38. The top surface of the ferrite bar 38 as seen in FIG. 8, which corresponds to the disk sliding surface of the core sliders, is ground so as to establish the predetermined optimum depth l of the magnetic gaps 32, 34.

Figure 10:
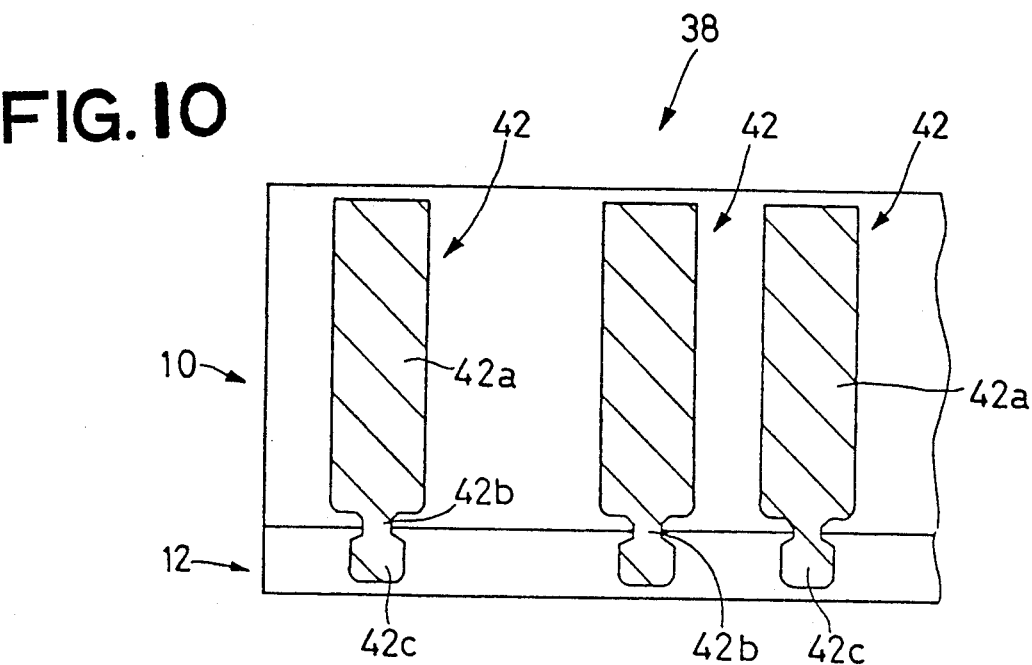
FIG. 10 is a fragmentary plan view of the ferrite bar to which a third etching mask is applied.

After the ferrite bar 38 is ground so as to provide the optimum depth of the magnetic gaps 32, 34, a third etching mask 42 is applied to the disk sliding surface of the ferrite bar 38, as shown in FIG. 10. The third etching mask 42 has a masking pattern consisting of a plurality of identical maskings each corresponding to a raised section to be formed on the ferrite bar 38. As described later, each of the two core sliders prepared from the ferrite bar 18 has the two raised sections, each consisting of an air bearing portion 44, a track portion 46 extending from one end of the air bearing portion 44, and a protrusion 48 extending from one end of the track portion 46 remote from the air bearing portion 44, as indicated in FIG. 11.

Described more specifically, each masking of the third etching mask 42 consists of an elongate rectangular portion 42a covering the air bearing portion 44, a neck portion 42b which has a smaller width than the elongate rectangular portion 42a and covers the track portion 46, and a head portion 42c which has a width intermediate betweeen those of the rectangular and neck portions 42a, 42b and covers the protrusion 48. The elongate rectangular portion 42a and the head portion 42c, which are connected by the neck portion 42b, are positioned on the first and second ferrite blocks 10, 12, respectively, of the ferrite bar 38. On the other hand, the neck portion 42b is positioned across the two ferrite blocks 10, 12 that define the magnetic gaps 32, 34 therebetween. The ferrite bar 38 is provided with the five maskings 42 which are arranged in parallel relationship with each other such that the maskings are spaced apart from each other in the longitudinal direction of the ferrite bar 38. The adjacent maskings 42 are aligned with the reading and recording magnetic gaps 32, 34, respectively. Namely, the two maskings 42 extend across the reading magnetic gaps 32, while the three maskings 42 extend across the recording magnetic gaps 34.

The third etching mask 42 may be formed in the same manner as the first and second etching masks 16, 22.

Figure 11A:
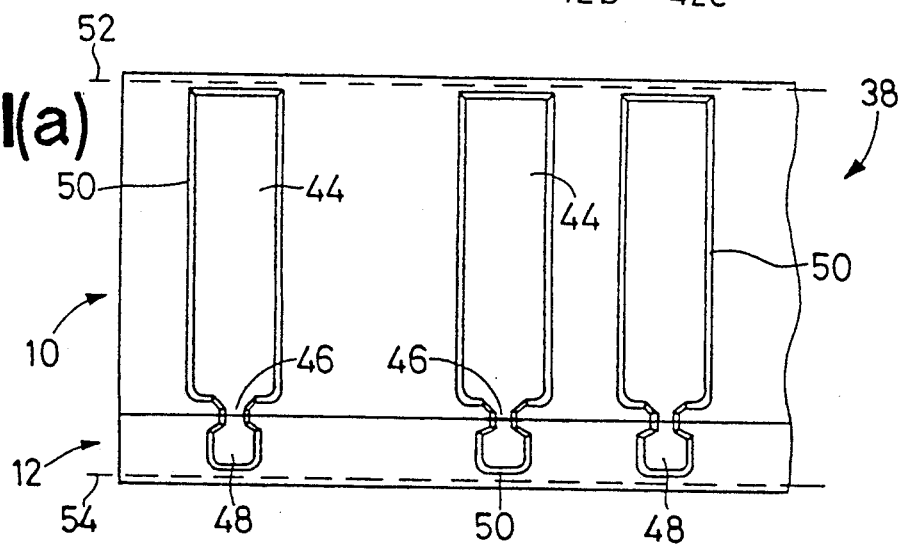
FIG. 11(a) is a fragmentary plan view of the ferrite bar which has been etched through the third etching mask.
Figure 11B:
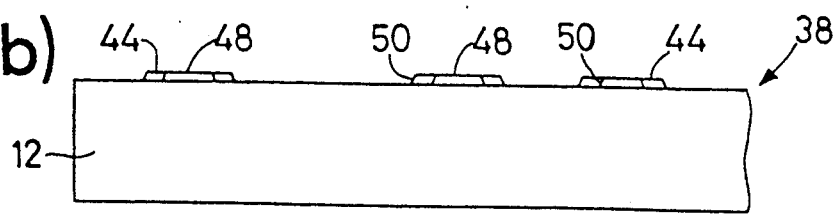
FIG. 11(b) is a fragmentary elevational view of the ferrite bar of FIG. 11(a)

The surface of the ferrite bar 38 on which the third etching mask 42 is formed is chemically etched to an appropriate depth, in the same manner described above with respect to the etching masks 16, 22 to form the primary groove 20 and secondary recesses 26. As a result, stock is removed from the portions of the ferrite bar 38 not covered by the maskings 42, whereby the covered portions are left as the raised sections having a height corresponding to the etching depth (amount of stock removal from the exposed portions), as shown in FIGS. 11(a) and 11(b). Described more particularly, the portion covered by the elongate rectangular portion 42a of each masking 42 is left as the air bearing portion 44, the portion covered by the neck portion 42b as the relatively narrow track portion 46, and the portion covered by the head portion 42c as the protrusion 48 whose width is smaller than that of the air bearing portion 44 and larger than that of the track portion 46. The portions 44, 46 and protrusion 48 have the same height as measured from the etched portions of the ferrite blocks 10, 12. Since the neck portions 42b of all the maskings of the third etching mask 42 have the same width, the track portions 46 of all the raised sections corresponding to the maskings 42 have the same width. However, the reading and recording magnetic gaps 32, 34 corresponding to each pair of the two adjacent track portions 46 have different sizes, as described above.

The etching process using the third etching mask 42 permits the edges of the air bearing portion 44, track portion 46 and protrusion 48 of each raised section to be chamferred as inclined surfaces 50, which are inclined at an angle of 45-80°, preferably 60-75° with respect to the surface of the air bearing portion 44 (disk sliding surface of the core slider). These inclined surfaces 50 are effective to protect the edges of the air bearing portion 44 and protrusion 48 against chipping due to sliding contact with a magnetic disk during operation of the core slider. Thus, the instant method to produce the core slider does not require otherwise required grinding operations to form the raised section 44, 46, 48 with such chamfered or inclined surfaces.

After the etching with the third etching mask 42, the ferrite bar 38 is cut along cutting lines 52, 54 indicated in dashed lines in FIG. 11(a), parallel to the length of the ferrite bar. The distance between the cutting lines 52, 54 is equal to the length of the core sliders as measured in the direction of length of the air bearing portion 44.

Figure 12:
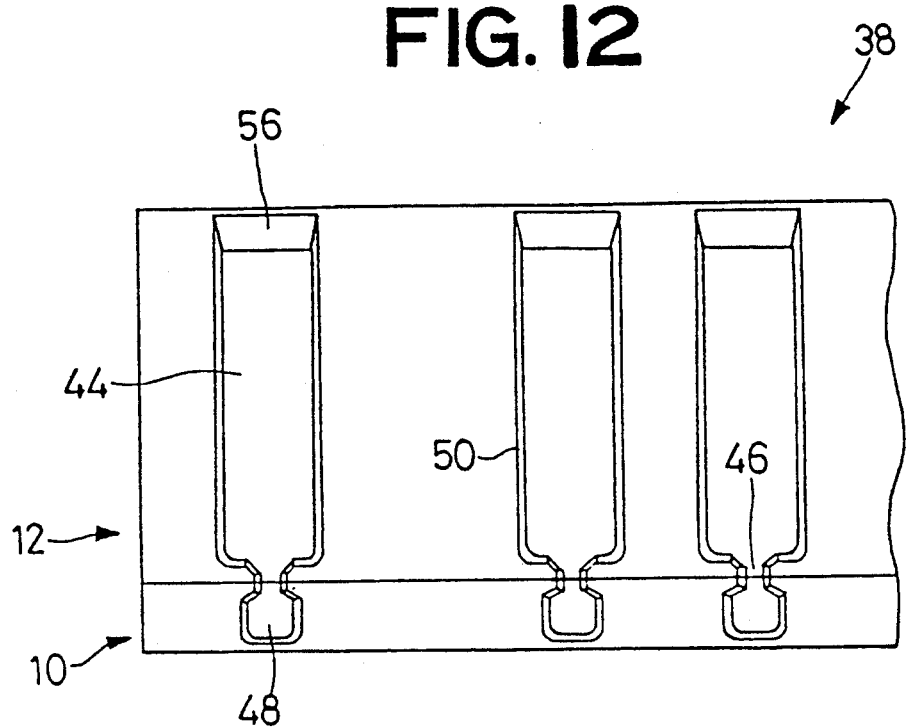
FIG. 12 is a fragmentary plan view of the ferrite bar having air bearing portions with leading ramps.
Figure 13:
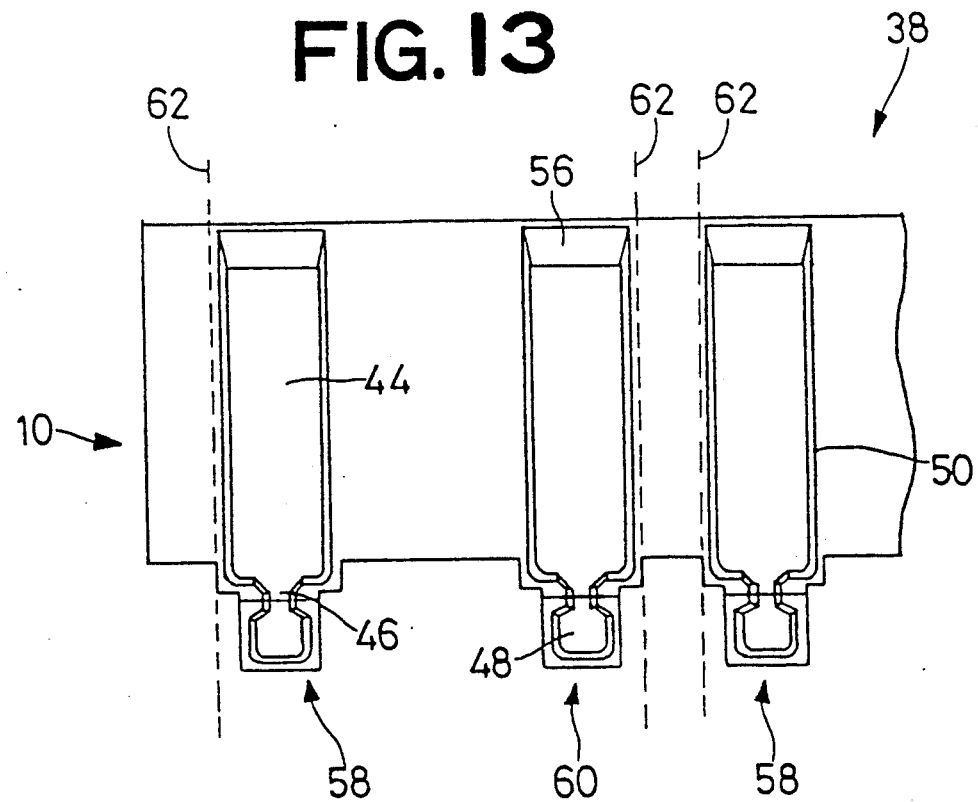
FIG. 13 ia a fragmentary plan view of the ferrite bar which has been machined to form yoke portions.

With the ferrite bar 38 cut along the cutting lines 52, 54 to establish the predetermined length of the core sliders, the leading ends of the raised sections formed by the etching, that is, the leading end sections of the air bearing portions 44 remote from the track portions 46 are chamfered as chamfered portions or leading ramps 56, as indicated in FIG. 12. The leading ramps 56 are inclined by a relatively small angle with respect to the surface of the air bearing portions 44. Then, unnecessary trailing end portions of the ferrite bar 38 (first and second ferrite blocks 10, 12) are removed, so as to form adjacent first and second yoke portions 58, 60, each of which includes a part of the corresponding track portion 46, as shown in FIG. 13. These first and second yoke portions 58, 60 are provided alternately in the longitudinal direction of the ferrite bar 38. Subsequently, the ferrite bar 38 is cut along cutting lines 62 perpendicular to its length, so that each cut segment includes a set of the first and second yoke portions 58, 60, as indicated in FIG. 13. The thus obtained cut segment serves as a core slider as shown in FIG. 14.

Figure 15A:
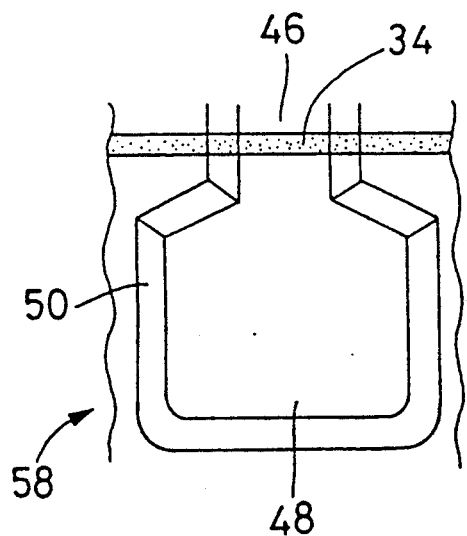
FIGS. 15(a) and 15(b) are enlarged fragmentary plan views of the yoke portions of the core slider of FIG. 14.
Figure 15B:
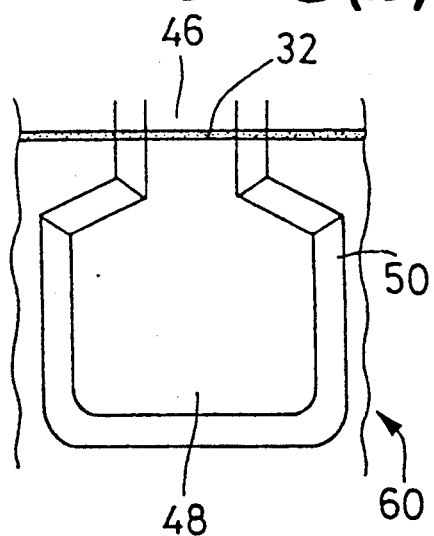

As is apparent from the foregoing description, the core slider shown in FIG. 14 includes a slider body 64 having the pair of parallel air bearing portions 44, 44 and part of the track portions 46, and further includes the pair of yoke portions 58, 60 each including the other part of the track portion 46 and the protrusion 48, as shown in enlargement in FIGS. 15(a) and 15(b). The air bearing portions 44 have a predetermined height from the surface of the slider body 64, and are spaced from each other in a transverse direction perpendicular to a direction in which the air bearing portions 44 extend in parallel with each other. The yoke portions 58, 60 are formed integrally with the slider body 64, so as to cooperate with the slider body 64 to form the track portions 46 and define closed magnetic paths. The yoke portion 60 cooperates with the slider body 64 to define therebetween the relatively narrow reading magentic gap 32 open in the corresponding track portion 46, while the other yoke portion 58 cooperates with the slider body 64 to define therebetween the relatively wide recording magnetic gap 34. The two track portions 46 of the yoke portions 58, 60 have the same width, and have the same height as the air bearing portions 44. The protrusions 48 of the yoke portions 58, 60 extend from the ends of the track portions 46 remote from the air bearing portions 44, and have the same height as the air bearing and track portions 44, 46 and a width which is smaller than that of the air bearing portions 44 and larger than that of the track portions 46.

In the present embodiment, the second ferrite block 12 has the three secondary recesses 26 which define the size of the recording magnetic gap 34, and the ferrite bar 38 has the three yoke portions 58. However, the two identically shaped core sliders are produced from the ferrite bar 38. It is possible that the ferrite bar 38 have the three yoke portions 60 and the two yoke portions 58 which are alternately positioned in the longitudinal direction of the bar. In this case, too, the two identical core sliders may be produced from the ferrite bar 38. Where the positions of the yoke portions 58, 60 relative to each other in the longitudinal direction of the ferrite bar 38 are reversed between the two ferrite bars 38, 38 obtained from the ferrite body, the two yoke portions 58 and the two yoke portions 60 may be formed on the ferrite bar 38, so that the two core sliders may be obtained from each ferrite bar 38. It is also possible that the number of the core sliders to be produced from one of the two ferrite bars 38, 38 obtained from the ferrite body of FIG. 7 is different from that of the core sliders to be produced from the other ferrite bar 38. The extra yoke portion 58, 60 (e.g., the third yoke portion 58 in the illustrated embodiment) which is not used for producing the core sliders need not be formed by machining the ferrite bar 38. The secondary recesses 26 corresponding to the recording magnetic gaps 34 and the yoke portions 58 may be formed so that the magnetic gaps 34 (yoke portions 58) on the two ferrite bars 38, 38 are located at different positions in the longitudinal direction of the bars. In this case, each secondary recess 26 consists of two separate recesses which are spaced apart from each other in the longitudinal direction of the ferrite block 12, for example.

According to the method of producing a core slider as described above, the pair of parallel air bearing portions 44, 44, the corresponding pair of track portions 46, 46, and the corresponding pair of protrusions 48, 48 are simultaneously formed by etching, as a raised section which extends from the etched portions of the slider body 64. At the same time, the peripheral edges of the air bearing and track portions 44, 46 and the protrusions 48 are chamfered as the inclined surfaces 50. Thus, the instant method eliminates the conventionally practiced, time-consuming grinding operations to form the raised cofiguration 44, 46, 48 and chamfer the opposite lateral edges of the air bearing portions 44 and protrusions 48. Accordingly, the instant method assures considerably improved production efficiency.

In the illustrated method, the secondary recesses 26 for the recording magnetic gaps 34 are formed in the bottom surface of the previously formed primary groove 20 for the reading magnetic gap 32. This makes it possible to reduce the depth of the secondary recesses 26, accordingly shortening the required etching time for the recesses 26 and further improving the production efficiency.

In the RDD core slider constructed and manufactured as described above, the reading magnetic gap 32 defined by and between the slider body 64 and the yoke portion 60 has a relatively small size suitable for exhibiting the optimum information reading or reproducing characteristics, while the recording magnetic gap 34 defined by and between the slider body 64 and the yoke portion 58 has a relatively large size suitable exhibiting the optimum information recording or writing characteristics. In other words, the track portion 46 associated with the yoke portion 60 is used to read information from a magnetic disk, while the track portion 46 associated with the yoke portion 58 is used to write information on the magnetic disk. This arrangement enables the recording magnetic gap 34 to perform excellent information reading and writing characteristics, permitting an increased density of storage of information per unit area of the magnetic disk.

The instant core slider can be manufactured with high productivity, according to the procedure described above, even when the positions of the yoke portions 58, 60 are reversed with respect to those shown in FIG. 14. Further, the manufacturing procedure is not limited to that described above.

There will next be described the method of producing a core slider wherein the pair of track portions have different widths while the corresponding magnetic gaps have the same size in the direction of extension of the air bearing portions.

Figure 16:
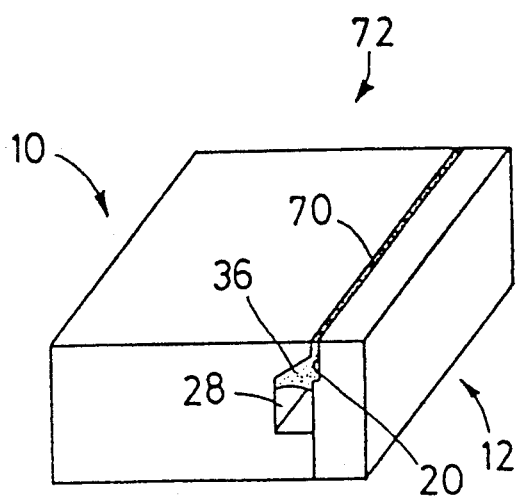
Figure 17:
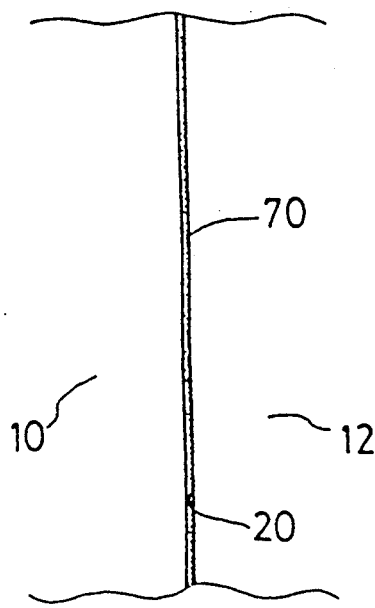

In this method, too, the first and second ferrite blocks 10, 12 as used in the first embodiment are employed to prepare a pair of ferrite bars 72, 72, in the same manner as in the first embodiment, except for the provision of the secondary recesses 26. Each ferrite bar 72 has a constant magnetic gap 70 over the entire length, as shown in FIGS. 16 and 17. In the present embodiment, a groove to define the size of the magnetic gap 70 is not necessarily prepared by chemical etching as in the first embodiment, but may be formed by grinding. Further, the magnetic gap 70 may be formed by providing a glass layer on at least one of the abutting surfaces 14, 14 of the first and second ferrite blocks 10, 12, such that the thickness of the glass layer defines the size of the magnetic gap 70.

Figure 18:
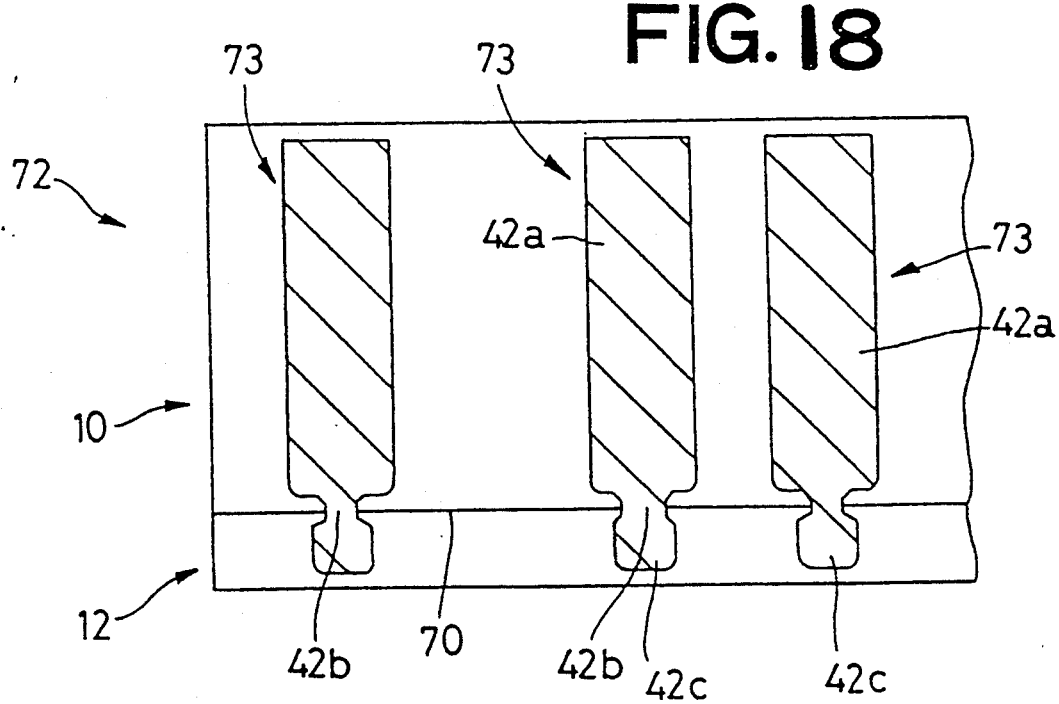
Figure 19:
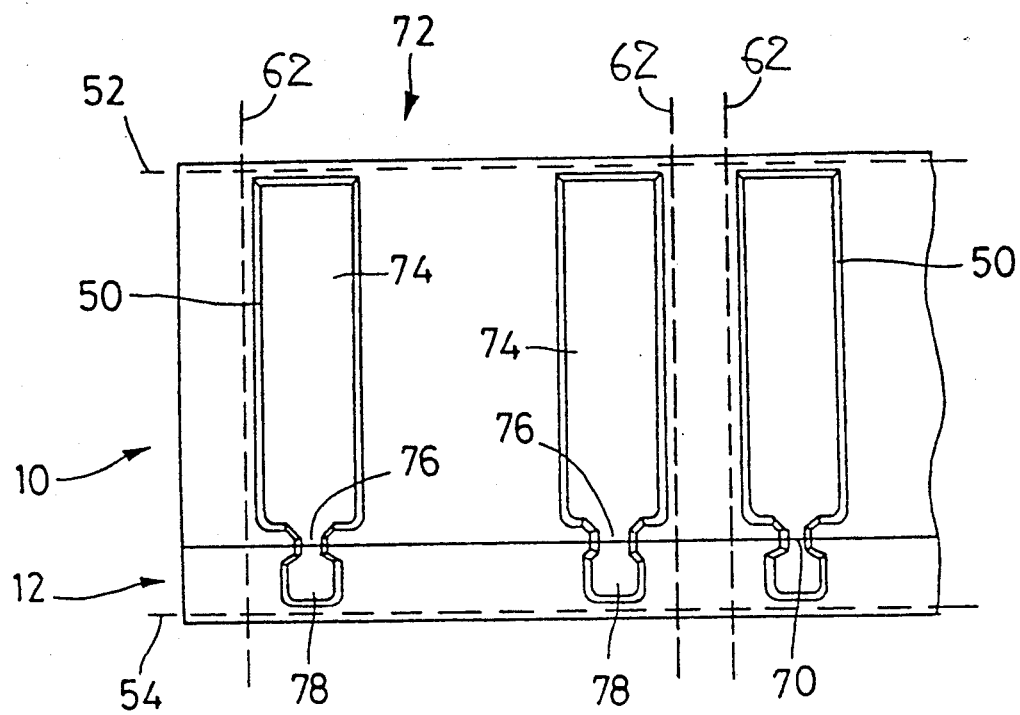

On the ferrite bar 72 having the constant magnetic gap 70, there is formed an etching mask 73 similar to the third etching mask 42 of the first embodiment, as illustrated in FIG. 18. The masked ferrite bar 72 is etched to provide raised sections each consisting of an air bearing portion 74, a track portion 76 and a protrusion 78 as shown in FIG. 19, similar to the air bearing portion 44, track portion 46 and protrusion 48 which are provided in the first embodiment. In the present embodiment, however, the neck portions 42b of the adjacent two maskings 73 have different widths in the longitudinal direction of the ferrite bar 72, as indicated in FIG. 18. Therefore, the corresponding adjacent two track portions 76 prepared by the etching of the bar 72 have different track portions 76, as indicated in FIG. 19.

Figure 20:
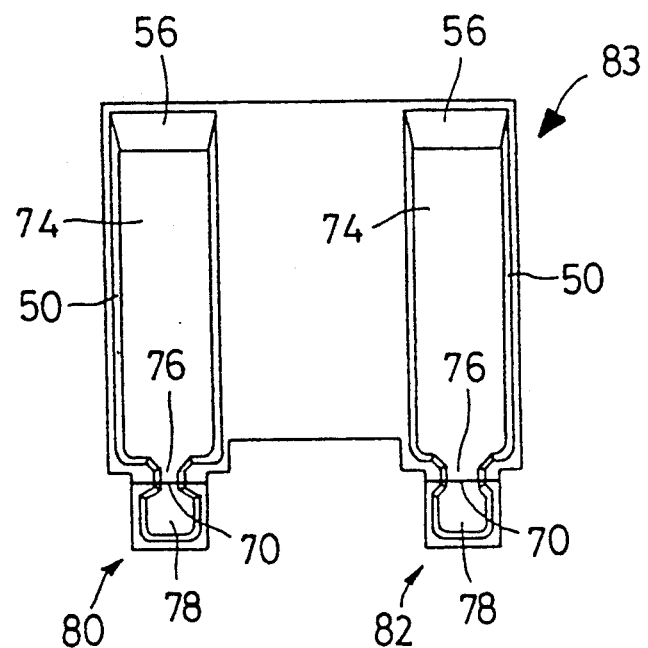
Figure 21A:
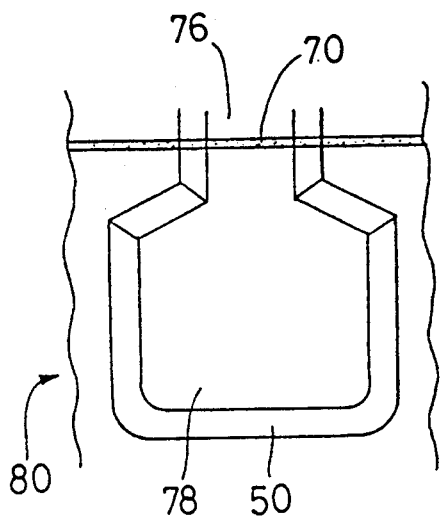
Figure 21B:
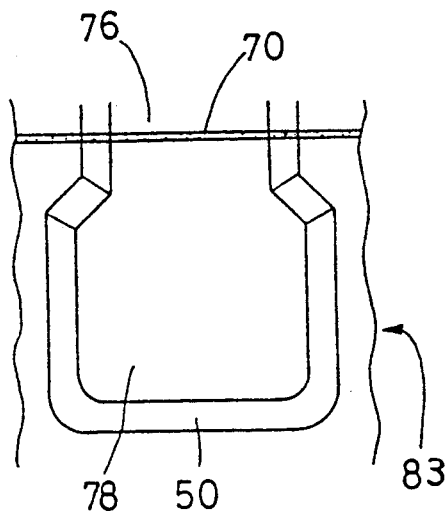

The ferrite bar 72 having the raised sections 74, 76, 78 is cut along the cutting lines 52, 54, and the air bearing portions 74 are chamfered at their leading ends, to provide the leading ramps 56. Then, yoke portions 80, 82 which include part of track portions 76 having the different widths are formed by cutting off the appropriate portions of the second ferrite block 12 of the bar 72, such that the yoke portions 80, 82 cooperate with the slider body 83 to form the track portions 76, as shown in FIG. 20. Subsequently, the ferrite bar 72 is cut along the cutting lines 62 perpendicular to the longitudinal direction of the bar, whereby core sliders are obtained from the ferrite bar 72. As shown in FIG. 20, each core slider includes a slider body 83 having the two parallel air bearing portions 74 and part of the track portions 76, and the two yoke portions 80, 82 formed integrally with the slider body 83 so as to cooperate with the slider body 83 to form the track portions 76. The track portions have different widths smaller than the width of the air bearing portions 74. The track portions 76 cooperate with the slider body 83 to define the magnetic gaps 70 having the same size (in the direction of extension of the air bearing portions 74). The yoke portions 80, 82 also include the protrusions 78, 78 protruding from the track portions 76, in the direction away from the air bearing portions 74, as shown in FIGS. 21(a) and 21(b).

In the RDD core slider prepared according to the present embodiment, too, the air bearing portions 74, 74 the corresponding track portions 76, 76 and the corresponding protrusions 78, 78 are formed simultaneously in the chemical etching process, together with the inclined surfaces 50 formed so as to define the perimeter of the top surfaces of the portions 74, 76 and protrusions 78. Thus, the instant method assures high production efficiency.

In the present core slider, the width of the track portion 76 associated with the yoke portion 80 is smaller than that of the track portion 76 associated with the other yoke portion 82. The relatively narrow track portion 76 associated with the yoke portion 80 is used to read information from a magnetic disk, while the relatively wide track portion 76 associated with the yoke portion 82 is used to write information on the disk. This arrangement also assures enhanced 'off-track' operating characteristics. Namely, the instant core slider is substantially free from reproduction of remnant information which reduces the S/N ratio when information written over the previously stored information is read.

While the instant core slider is suitably produced according to the method described above, changes and modifications may be made in the details of the manufacturing procedure.

There will be described a third embodiment of the present invention, wherein the core slider has a pair of track portions with different widths, and the corresponding magnetic gaps have different sizes. Namely, the magnetic gap corresponding to the relatively narrow track portion has a smaller size than the magnetic gap corresponding to the relatively wide track portion. This core slider is suitably produced in the following manner, which is a compromise between the methods used in the first and second embodiments.

Figure 22:
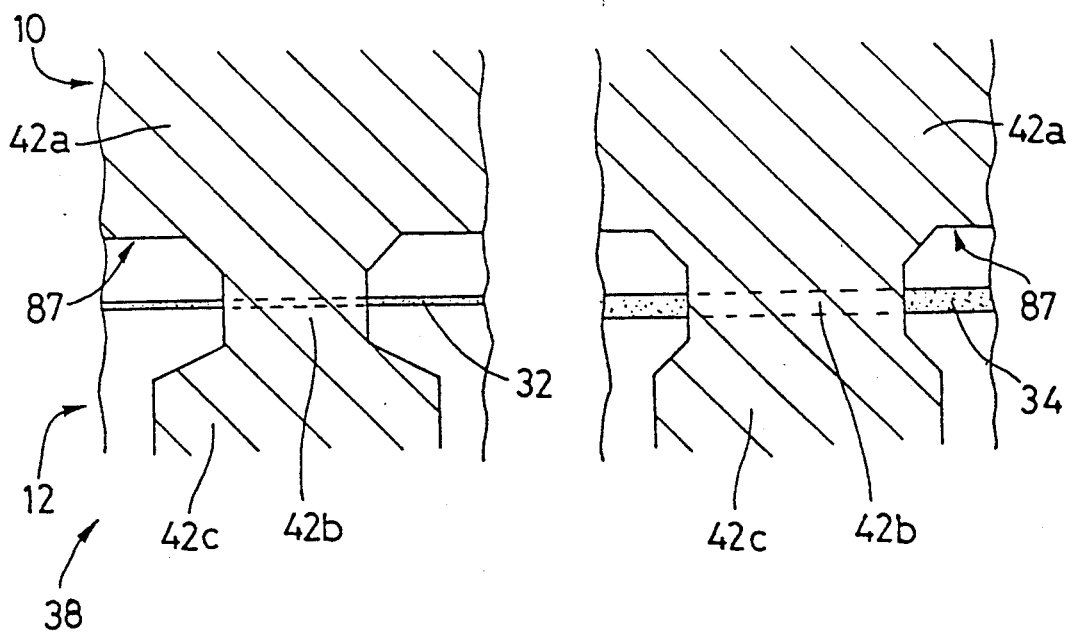

The ferrite bars 38, 38 as used in the first embodiment are prepared from the first and second ferrite blocks 10, 12 as used in the first embodiment, with the same procedure as practiced in the first embodiment. An etching mask 87 is applied to each ferrite bar 38, in the same manner as in the first embodiment, except that the neck portions 42b of the adjacent maskings 87 have different widths, as indicated in FIG. 22. The relatively narrow neck portion 42b is formed so as to extend across the relatively narrow magnetic gap 32, while the relatively wide neck portion 42b is formed so as to extend across the relatively wide magnetic gap 34.

Figure 23:
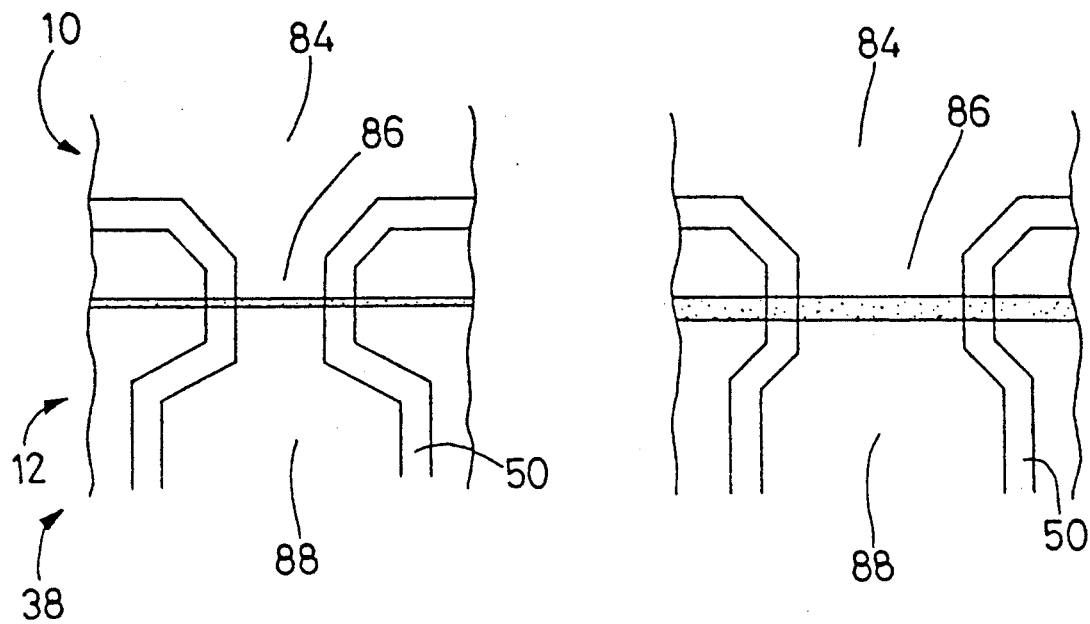
Figure 24:
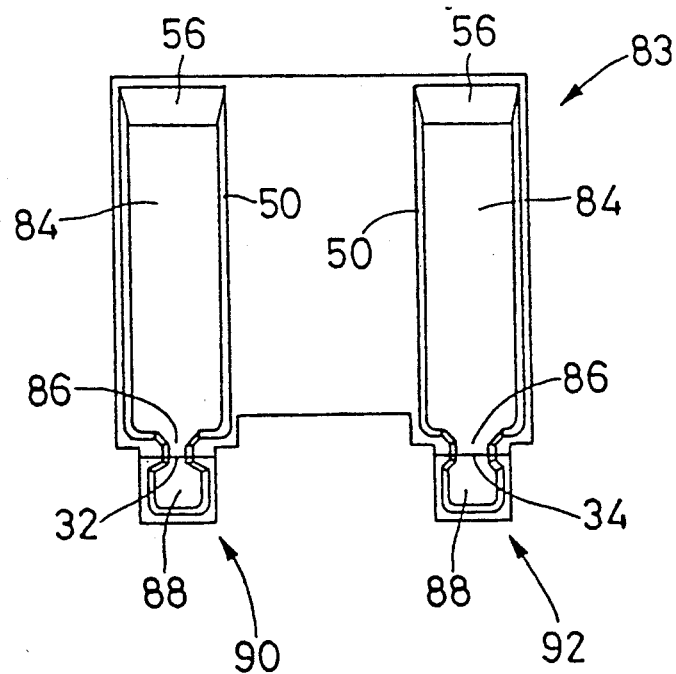

With the ferrite bar 38 etched through the etching mask 87, there are formed raised sections each consisting of an air bearing portion 84, a track portion 86 and a protrusion 88 as shown in FIG. 23, which correspond to the air bearing portion 74, track portion 76 and protrusion 78 which are formed on the ferrite bar 72 of the second embodiment. One of the track portions 86 of the two adjacent raised sections has a smaller width than the other track portion. Each raised section has the inclined surfaces 50 which define the perimeter of the top surfaces of the portions 84, 86 and protrusion 88. Since the relatively narrow and wide neck portions 42b of the mask 87 are formed so as to extend across the relatively narrow and wide magnetic gaps 32 and 34, respectively, the relatively narrow track portion 86 is formed across the relatively narrow magnetic gap 32, while the relatively wide track portion 86 is formed across the relatively wide magnetic gap 34.

Figure 25A:
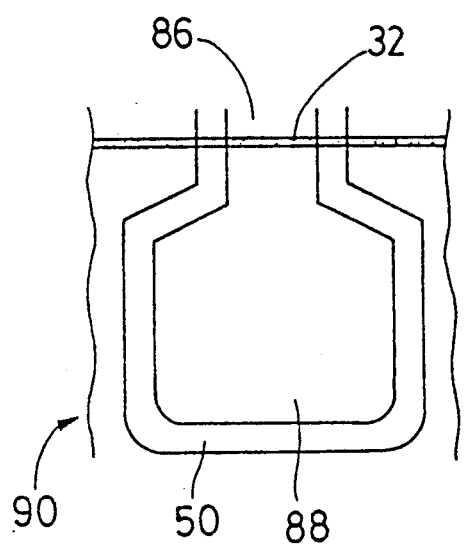
Figure 25B:
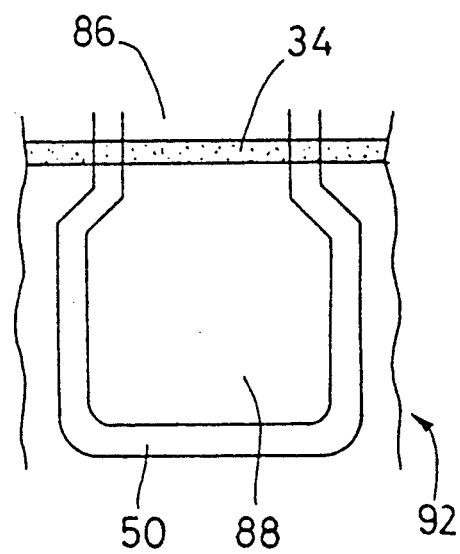

After the raised sections 84, 86, 88 are formed by etching, the ferrite bar 38 is processed in the same manner as in the first and second embodiments, to produce core sliders each of which has the slider body 83 having the two air bearing portions 84 and part of the track portions 86, and two different yoke portions 90, 92 formed integrally with the slider body 83 so as to cooperate with the slider body 83 to define the track portions 86. The yoke portion 90 cooperates with the slider body 83 to define the relatively narrow magnetic gap 32 open in the relatively narrow track portion 86, while the yoke portion 92 cooperates with the slider body 83 to define the relatively wide magnetic gap 34 open in the relatively wide track portion 86, as indicated in FIGS. 25(a) and 25(b).

The method according to the present third embodiment also permits efficient simultaneous formation by etching of the two air bearing portions 84, 84, the corresponding two track portions 86, 86, the corresponding two protrusions 88, 88, and the inclined surfaces 50 defining the perimeter of the portions 84, 86 and protrusions 88.

In the core slider constructed as described above, the width of the track portion 86 associated with the yoke portion 90 is smaller than that of the track portion 86 associated with the other yoke portion 92, and the magnetic gap 32 corresponding to the yoke portion 90 is narrower than the magnetic gap 34 corresponding to the yoke portion 92. The relatively narrow track portion 86 is used to read information from a magnetic disk, while the relatively wide track portion 86 is used to write information on the disk. Therefore, the instant core slider not only exhibits excellent 'off-track' operating characteristics, but also permits improved information writing and reading operations.

Although the instant core slider is suitably produced according to the method described above, like the core sliders of the first and second embodiments, it will be understood that the method may be modified as needed.

While the present invention has been described in its presently preferred embodiments with a certain degree of particularity, for illustrative purpose only, it is to be understood that the invention is not limited to the details of the illustrated embodiments, but may be embodied with various changes, modifications and improvements, which may occur to those skilled in the art, without departing from the spirit and scope of the invention defined in the appended claims. For instance, three or more ferrite bars 38, 72 may be prepared from the first and second ferrite blocks 10, 12, or only one ferrite bar 38, 72 is prepared from the blocks 10, 12. Further, only one core slider may be prepared from the first and second ferrite blocks 10, 12.

What is claimed is:

1. A method of producing a core slider for a rigid magnetic disk drive, comprising the steps of:

forming a primary groove in at least one of abutting surfaces of a first and a second ferrite block, by etching said at least one abutting surface through a first etching mask applied thereto;

forming a plurality of secondary recesses in at least one of said abutting surfaces of the first and second ferrite blocks, by etching said at least one abutting surface through a second etching mask applied thereto;

butting and bonding together said first and second ferrite blocks at said abutting surfaces, to form an integral ferrite bar which has a closed magnetic path defined between said first and second blocks, said ferrite bar having a first magnetic gap corresponding to a total depth of said primary groove, and a second magnetic gap corresponding to a total depth of said primary groove and said secondary recesses;

applying a third etching mask to a surface of said ferrite bar in which said first and second magnetic gaps are open, and etching said surface of the ferrite bar to form a plurality of parallel spaced-apart air bearing portions on said first ferrite block, and a plurality of track portions which extend from said air bearing portions, respectively, and between said first and second ferrite blocks, said air bearing portions and said track portions having a predetermined height, and said track portions having a same width in a transverse direction perpendicular to a direction of extension of said air bearing portions, said first magnetic gap being open in one of each pair of two adjacent track portions of said plurality of track portions, while said second magnetic gap being open in the other of said each pair of two adjacent track portions; and cutting said ferrite bar to prepare at least one core slider, each of which includes a slider body having the two adjacent air bearing portions corresponding to said adjacent two track portions, and a pair of yoke portions which are formed on said second ferrite block and which cooperate with said slider body to form said adjacent two track portions.

2. A method of producing a core slider for a rigid magnetic disk drive, comprising the steps of:

forming a groove in at least one of abutting surfaces of a first and a second ferrite block;

butting and bonding together said first and second ferrite blocks at said abutting surfaces, to form an integral ferrite bar which has a closed magnetic path defined between said first and second blocks, said ferrite bar having a magnetic gap corresponding to a depth of said groove;

applying an etching mask to a surface of said ferrite bar in which said magnetic gap is open, and etching said surface of the ferrite bar to form a plurality of spaced-apart air bearing portions on said first ferrite block, and a plurality of track portions which extend from said air bearing portions, respectively, and between said first and second ferrite blocks, said air bearing portions and said track portions having a predetermined height, one of each pair of two adjacent track portions of said plurality of track portions having a larger width in a transverse direction perpendicular to a direction of extension of said air bearing portions, than the other of said each pair of two adjacent track portions; and cutting said ferrite bar to prepare at least one core slider, each of which includes a slider body having the two adjacent air bearing portions corresponding to said two adjacent track portions, and a pair of yoke portions which are formed on said second ferrite block and which cooperate with said slider body to form said two adjacent track portions.

3. A method of producing a core slider for a rigid magnetic disk drive, comprising the steps of:

forming a primary groove in at least one of abutting surfaces of a first and a second ferrite block, by etching said at least one abutting surface through a first etching mask applied thereto;

forming a plurality of secondary recesses in at least one of said abutting surfaces of the first and second ferrite blocks, by etching said at least one abutting surface through a second etching mask applied thereto;

butting and bonding together said first and second ferrite blocks at said abutting surfaces, to form an integral ferrite bar which has a closed magnetic path defined between said first and second blocks, said ferrite bar having a first magnetic gap corresponding to a total depth of said primary groove, and a second magnetic gap corresponding to a total depth of said primary groove and said secondary recesses;

applying a third etching mask to a surface of said ferrite bar in which said first and second magnetic gaps are open, and etching said surface of the ferrite bar to form a plurality of spaced-apart air bearing portions on said first ferrite block, and a plurality of track portions which extend from said air bearing portions, respectively, and between said first and second ferrite blocks, said air bearing portions and said track portions having a predetermined height, said first magnetic gap being open in one of each pair of two adjacent track portions of said plurality of track portions, while said second magnetic gap being open in the other of said each pair of two adjacent track portions, said other of said each pair of two adjacent track portions having a larger width in a transverse direction perpendicular to a direction of extension of said air bearing portions, than said one of said each pair of two adjacent track portions; and cutting said ferrite bar to prepare at least one core slider, each of which includes a slider body having the two adjacent air bearing portions corresponding to said two adjacent track portions, and a pair of yoke portions which are formed on said second ferrite block and which cooperate with said slider body to form said two adjacent track portions.

* * * * *